United States Patent [19]

Patterson et al.

[11] Patent Number: 4,674,674
[45] Date of Patent: Jun. 23, 1987

[54] METHOD FOR FABRICATING FIBERGLASS INSULATED MOBILE CRYOGENIC TANKAGE

[75] Inventors: Michael F. Patterson, Clarence Center; Richard C. Cipolla, Williamsville, both of N.Y.

[73] Assignee: Union Carbide Corporation, Danbury, Conn.

[21] Appl. No.: 724,558

[22] Filed: Apr. 18, 1985

Related U.S. Application Data

[60] Division of Ser. No. 615,688, Jun. 1, 1984, Pat. No. 4,579,249, which is a continuation of Ser. No. 363,097, Mar. 29, 1982, abandoned.

[51] Int. Cl.⁴ ............................................. F27B 14/00
[52] U.S. Cl. ................................. 228/176; 29/455 R; 228/184; 220/420; 220/421
[58] Field of Search ............. 228/176, 184; 29/455 R; 220/420–425, 452, 71, 901, 445, 446, 447

[56] References Cited

U.S. PATENT DOCUMENTS

| | | | |
|---|---|---|---|
| 844,272 | 2/1907 | Fate | 220/425 |
| 1,249,785 | 12/1917 | Layman et al. | 220/420 X |
| 1,337,278 | 4/1920 | Schulz | 220/420 X |
| 1,521,148 | 12/1924 | Dennett et al. | 220/421 |
| 1,730,153 | 10/1929 | Lindsay . | |
| 1,809,929 | 6/1931 | Farmer | 220/420 |
| 1,984,261 | 12/1934 | Foy | 220/421 |
| 2,007,177 | 10/1959 | Daley | 220/420 |
| 2,439,806 | 4/1948 | Heineman | 220/421 X |
| 2,767,962 | 10/1956 | Blackburn | 220/420 X |
| 2,892,563 | 6/1959 | Morrison | 220/452 X |
| 2,907,177 | 10/1959 | Daley et al. | 220/420 X |
| 2,928,565 | 3/1960 | Glascoe, Jr. | 220/9 |
| 3,163,313 | 12/1964 | Reynolds et al. | 220/421 |
| 3,326,141 | 6/1967 | Graves | 220/444 X |
| 3,416,693 | 12/1968 | Covington et al. | 220/423 |
| 3,653,333 | 4/1972 | Taylor | 29/455 R |
| 3,698,588 | 10/1972 | Pogorski | 220/422 |
| 3,930,375 | 1/1976 | Hofmann | 220/421 |
| 4,104,783 | 8/1978 | Schultz et al. | 29/451 |
| 4,157,779 | 6/1979 | Ishii et al. | 228/176 |
| 4,168,014 | 9/1979 | Schultz et al. | 220/901 |
| 4,200,199 | 4/1980 | Perkins et al. | 220/420 |
| 4,308,967 | 1/1982 | Vater et al. | 220/71 |
| 4,323,620 | 4/1982 | Iwabuchi et al. | 220/452 X |
| 4,496,073 | 1/1985 | Silver | 220/901 |

FOREIGN PATENT DOCUMENTS 723621 2/1955 United Kingdom ............... 220/444

Primary Examiner—Nicholas P. Godici
Assistant Examiner—Kurt Rowan
Attorney, Agent, or Firm—Stanley Ktorides

[57] ABSTRACT

An improved method for fabricating mobile cryogenic storage vessels insulated with fiberglass batting, one layer of which is non-compressively secured to the outer shell and a second layer non-compressively secured either to the outer shell or to the inner vessel in such manner as to fill all spaces between the support members and so as to leave an annular evacuable space between the layers of insulation or between the layers of insulation and the inner vessel.

12 Claims, 7 Drawing Figures

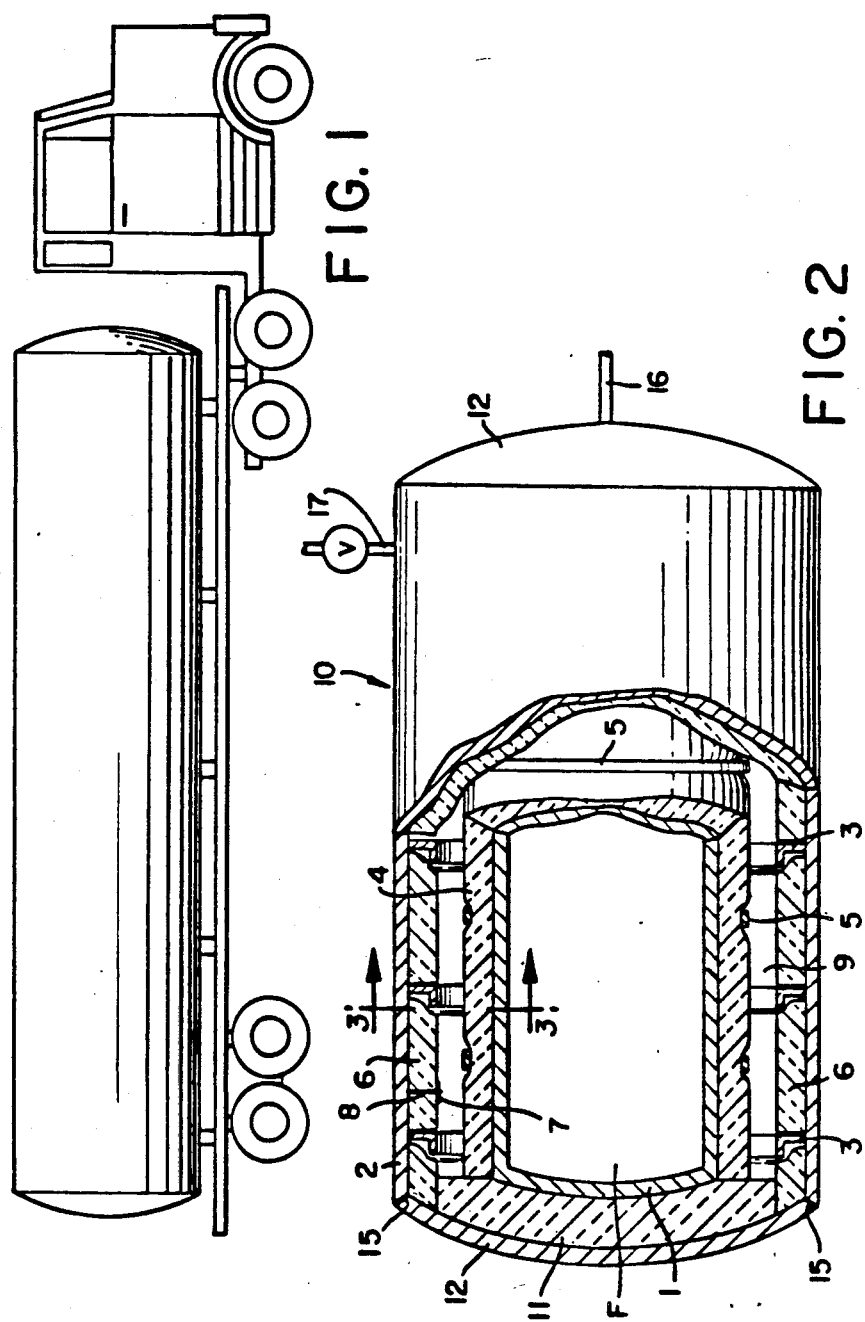

METHOD FOR FABRICATING FIBERGLASS INSULATED MOBILE CRYOGENIC TANKAGE

This application is a division of prior U.S. application Ser. No. 615,688, filed June 1, 1984 now U.S. Pat. No. 4,579,249, which is a continuation of prior U.S application Ser. No. 363,097, filed Mar. 29, 1982, now abandoned.

TECHNICAL FIELD

The present invention relates to an improved method and apparatus for insulating mobile cryogenic storage vessels of the type having a cylindrically shaped inner storage vessel surrounded by a relatively thin outer shell and an intermediate evacuable insulation space therebetween. The outer shell is provided with a plurality of axially-spaced support members extending into the evacuable space for supporting the outer shell against the external atmospheric force which is exerted against it when the intermediate space is evacuated.

BACKGROUND

It is well-known that cryogenic liquid storage vessels may be insulated by using a double walled construction with insulation material disposed therebetween. Granular or particulate type of insulation material, for example, perlite powder, is generally a more effective insulation at high vacuum (i.e., below about 100 microns of mercury) and is more economical to use. In cryogenic transport applications in order to minimize weight, the double walled container is designed with a thin outer shell reinforced by axially-spaced internal support members or rings. The presence of these internal support members within the intermediate evacuable space, however, makes it difficult to fill the space with any insulation that is not granular. Granular insulation is particularly useful because it can simply be poured into the insulation space in such manner that all of the space, even those around the supports, are readily filled.

However, a disadvantage associated with the use of granular or particulate type insulation is its tendency to settle and compact. Settling causes loss of insulation from the upper sections of a storage vessel, hereby increasing overall heat transfer to the cryogenic liquid stored within the vessel. This effect is accelerated when the storage vessel is subjected to outside forces, such as vibration which is normally encountered in mobile applications. Another contributor to the settling of granular insulation in cryogenic storage vessels is thermal stress induced by thermal cycling; that is, the expansion and contraction of the inner storage vessel caused by normal use of the vessel.

Perlite insulation is generally considered a low density material; however, as compared with some fiberglass insulation, it has a relatively high density. This is a particularly important consideration in mobile transport applications, where the total over-the-road vehicle weight may be limited by regulations. The weight of the unfilled vehicle should therefore be minimized in order to maximize the pay load. This is difficult to do with perlite insulation since relative to some fiberglass insulation it not only has a high initial fill density, but its tendency to settle, necessitates the addition of even more perlite.

Linsay in U.S. Pat. No. 1,730,153 discloses a method for insulating a double-walled tank with fibrous insulation where metallic bands having circumferentially spaced blocks (e.g. of wood) attached thereto are wrapped at selected intervals around a cylindrical inner vessel. The fibrous insulating material (e.g., kapok fiber) is then wrapped around the inner vessel, totally enclosing the spaced, block-equipped bands. The outer shell is then wrapped around the insulated inner vessel and is anchored to the blocks on the spaced bands, e.g., by screws passing through the shell. This construction causes severe compression of the insulation over the blocks in order that they may function as structural members and transmit the shell load without further deformation. Moreover, in a long vessel the shell must be assembled piecemeal since there is no space to permit telescoping of the inner vessel into a unitized outer shell. Consequently, this technique is very labor-intensive and expensive.

Schultz, et. al, in their U.S. Pat. Nos. 4,104,783 and 4,168,014 describe respectively, a method for insulation and an insulation system for cryogenic transport intended as a replacement for the conventionally used perlite insulation. These patents disclose a method for, and an insulation system whereby fiber glass insulation is compressively wrapped around an inner storage container. The insulation is squeezed to a lesser thickness to increase the density of the insulation and to allow the inner vessel to be telescopingly positioned within the outer shell. The squeezing is accomplished by wrapping each layer of insulation with a continuous wire mesh. Tension is maintained on the wire mesh by a rod which is withdrawn once the inner vessel is positioned within the outer shell. Once the rod is removed, the tension is relaxed, and the insulation expands to fill the space between the outer shell and the inner vessel. However, in order to utilize this procedure the fiberglass insulation employed must be compressed to a relatively high density (4 to 6 lbs/cubic feet). This insulation system is disadvantageous because of the aforementioned weight considerations.

Moreover, the above installation approach cannot easily be adapted to the conventionally designed over-the-road cryogenic storage vessels which employ a thin outer shell with internal support rings. Applying all of the insulation to the inner container will leave the spaces between the axially-spaced rings at least partially devoid of insulation. Additionally, the compressed insulation will not be able to expand in the vicinity of the rings resulting in a further increase in the solid conductivity of the insulated apparatus.

OBJECT OF THE INVENTION

It is an object of the present invention to provide insulated double-walled cryogenic storage vessels having a thin outer shell and internal support members, and which avoid the disadvantages of the prior art.

It is another object of the present invention to provide an improved method for fabricating fiberglass insulated double-walled cryogenic storage vessels.

SUMMARY OF INVENTION

The above and other objects which will be apparent to those skilled in the art are achieved by the present invention, one aspect of which relates to:

A method for fabricating a storage vessel useful for transporting cryogenic liquid comprising the steps of:

(a) providing a cylindrically shaped closed inner storage vessel having a filling and discharge port and a vapor vent, said vessel being surrounded by a relatively thin coaxial outer shell, said vessel and said shell forming an evacuable space therebetween, said shell being provided with a plurality of axially-spaced circumferential support members extending into said evacuable space, said support members being fixedly attached to and reinforcing said outer shell against the external atmospheric force applied thereto upon evacuation of said evacuable space, (b) non-compressively securing at least one layer of fiberglass insulation batting to the cylindrical portion of the inner wall of said outer shell so as to substantially fill the space between said axially-spaced support members, (c) providing a second layer of non-compressed fiberglass insulation to the outer wall of the inner storage vessel in sufficient amount to fill all but a small annular portion of the evacuable space while also shielding the inner ends of the axially-spaced support members from the inner vessel, (d) telescopingly positioning the inner vessel within the outer shell, (e) non-compressively securing additional layers of fiberglass insulation batting to the ends of the storage vessel and welding the spherical end plates to the outer shell.

Another aspect of this invention relates to a storage vessel suitable for the transportation of cryogenic fluid comprising:

(a) a cylindrically shaped inner storage vessel closed at each end, and provided with a filling and discharge port and a vapor vent, said inner vessel being surrounded by a thin cylindrically shaped outer shell closed at each end and spaced outwardly therefrom, a sufficient distance to form an evacuable space therebetween said shell and said vessel, said outer shell being provided with a plurality of axially-spaced support members extending into said evacuable space for supporting said outer shell against the external atmospheric force applied thereto upon evacuation of said evacuable space (b) a first layer of fiberglass insulation batting non-compressively secured to the cylindrical portion of the inner wall of the outer shell so as to fill the spaces between the axially-spaced support members, (c) a second later of fiberglass insulation batting non-compressively secured to the outer wall of the inner storage vessel so as to shield the inner ends of the axially-spaced support members from the inner vessel, (d) means for supporting the inner storage vessel on the outer shell so as to provide a annular space of from about 0.25 to 1.25 inches between said first and second layers of fiberglass insulation batting.

(e) additional layers of fiberglass insulation batting non-compressively secured to the ends of the storage vessel.

An alternative method of fabricating a cryogenic storage vessel in accordance with the present invention is to have all of the fiberglass insulation secured to the outer shell comprising:

(a) non-compressively securing a first layer of fiberglass insulation batting to the inner wall of the outer shell in sufficient amount to fill all but a small annular portion between the adjacent stiffening rings, and (b) securing a second layer of non-compressed fiberglass insulation batting to the inner wall of the outer shell in sufficient amount to shield the inner ends of the axially-spaced support members from the inner vessel.

An alternative preferred embodiment of the present invention comprises a storage vessel suitable for the transportation of cryogenic liquid comprising:

(a) a first layer of fiberglass insulation batting non-compressively supported from the inner wall of the outer shell in sufficient amount to fill all but a small annular portion between the adjacent stiffening rings, and (b) a second layer of fiberglass insulation batting non-compressively secured to the inner wall of the outer shell in sufficient amount to shield the inner ends of the axially-spaced support members from the inner vessel.

The preferred vacuum levels maintained in the evacuable space are below 50 microns of mercury.

BRIEF DESCRIPTION OF THE DRAWINGS

FIG. 1 is an illustration of a typical tank tractor-trailer truck used for transporting cryogenic fluid in a storage vessel made in accordance with a preferred embodiment of the present invention.

FIG. 2 is a longitudinal elevational view, taken partly in cross-section, of a double walled vacuum storage vessel such as shown in FIG. 1, illustrating another preferred embodiment of the present invention;

DETAILED DESCRIPTION

Figure 3:
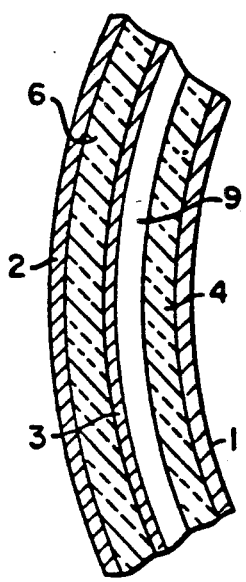
FIG. 3 is a cross-sectional view taken along line 3—3 of FIG. 2.

Where appropriate, corresponding elements in the various Figures are identified by the same reference numerals.

FIG. 1 is an illustration of a tank tractor-trailer truck used for transporting cryogenic fluid in storage vessels made in accordance with the present invention. The present invention's method of insulating cryogenic storage vessels is particularly suited for large trailer-trucks and railroad tank cars.

With non-compressively secured fiberglass insulation, it is possible to enter the vacuum space to make repairs or modifications without excessive delay and the inconvenience caused by granular insulation. In a typical mobile cryogenic transport, reduction of the insulation weight by up to 800 pounds is possible by utilizing fiberglass. This savings in insulation weight can now be allocated to additional cryogenic liquid.

Cryogenic storage container 10 shown in FIGS. 2 and 3 consists of an inner storage vessel 1 and an outer shell 2 surrounding vessel 1 in spaced relation thereto. Both the inner vessel 1 and the outer shell 2 may be fabricated from two or more cylindrical sections. Materials suitable for constructing the inner vessel 1 and the outer shell 2 include stainless steel or aluminum and carbon steel or aluminum respectively. When made from stainless steel, the minimum thickness of the inner vessel 1 is typically about 0.1 inch thick. A greater thickness may be necessary for the inner vessel 1 since it may have to withstand significant internal pressurization caused by the leakage of heat into the cryogenic fluid. The magnitude of this pressure is generally limited by a conventional relief valve 17 that communicates with the cryogenic fluid F inside vessel 1. To reduce the overall weight of the assembly, the outer shell or vessel 2 is made from as thin a material as possible, on the order of 0.1 inch in thickness. In order to support the outer shell 2 against its own weight and against the force of the atmospheric pressure imposed by evacuation of the space 9 between inner vessel 1 and the outer shell 2, a series of support members 3, which in the embodiment shown are structural L-rings, are axially-spaced along the inner wall of shell 2. External supports are not generally used because they exert unnecessary drag on the assembly during transportation. Forms of other than L-shaped support members 3, may be used, for example T-shaped support rings can also be used.

The inner vessel 1 is substantially non-compressively wrapped with a single layer of fiberglass batting 4. The fiberglass is held in place on the inner vessel by means of metal bands 5, which extend laterally around the insulation. Ordinary steel strip material, as commonly used in the packaging industry, is suitable for the metal bands 5. Wires may also be used to hold the fiberglass in place. The insulation is held in place at intervals with only as much force as is necessary to keep it from sliding off the inner vessel during acceleration of the assembly. As a result, the overall density of the insulation is not substantially affected. An important function of this layer of insulation 4 is to shield the inner ends of the support members 3 from the inner vessel 1. Absent such shielding, significant quantities of heat would be transferred to the inner vessel by conduction from the supports 3.

A single layer of fiberglass batting 6 is also attached to the outer shell 2. Individual sections of the insulation 6 are inserted within the spaces forward between the axially-spaced support rings 3. The insulation 6 is held in place on the upper walls of shell 2 by means of friction nut 7 attached to the studs 8 that are welded to shell 2.

The entire process of assembly takes place with the storage vessel (see FIG. 2) situated in a horizontal position. The storage vessel will be transported via large trailer-trucks (see FIG. 1) or railroad cars and therefore will always be situated in the horizontal position during transportation as well as while in use.

The thickness of the fiberglass layers applied to the inner vessel 1 and the outer shell 2 are such that an annular space 9 is formed when the inner vessel 1 is positioned within the outer shell 2. This space also permits the annular space 9 to be evacuated to a high vacuum, i.e., below about 100 microns of mercury, more rapidly. This is important, since higher vacuum levels are generally needed with fiberglass system than with perlite insulation in order to obtain essentially equivalent performance. One advantage of having annular space 9 is that removal of the inner vessel 1 from the outer shell 2 can easily be accomplished. This annular space 9 should be on the order of 0.25 to 1.25 inches in width preferably between about 0.5 to 1.0 inch in width.

Insulation suitable for the present invention should be composed of small diameter fiberglass fibers (i.e., an average fiber diameter below about 12 microns) provided in boards or batts having a density between about 1 and 3 pounds per cubic foot. Such insulation is commercially available in rolled batts, between $\frac{1}{2}$ and 3 inches thick and in densities between 0.6 and 2.0 pounds per cubic foot. The insulation is used in a non-compressed form so as to maximize its insulation effectiveness at high vacuum, while minimizing the quantity and therefore, the weight of insulation used.

After securing the insulation to the inner vessel 1 and the outer shell 2, the inner vessel 1 is telescopingly placed into the shell. Once the inner vessel 1 has been completely inserted into the outer shell 2, the ends of the assembly may be provided with additional fiberglass insulation 22, and the spherical end plates 12 of the assembly are welded to the outer shell 2 at 15. Once assembled, the tank may be filled and emptied of cryogenic fluid by means of the filling and discharge port 16.

Figure 5:
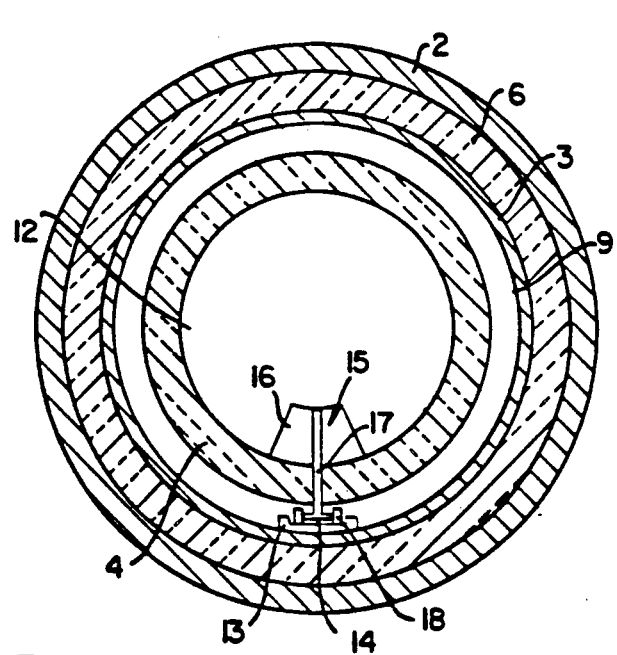
FIG. 5 is an end view of the assembly apparatus taken about line 5—5 of FIG. 4.
Figure 4:
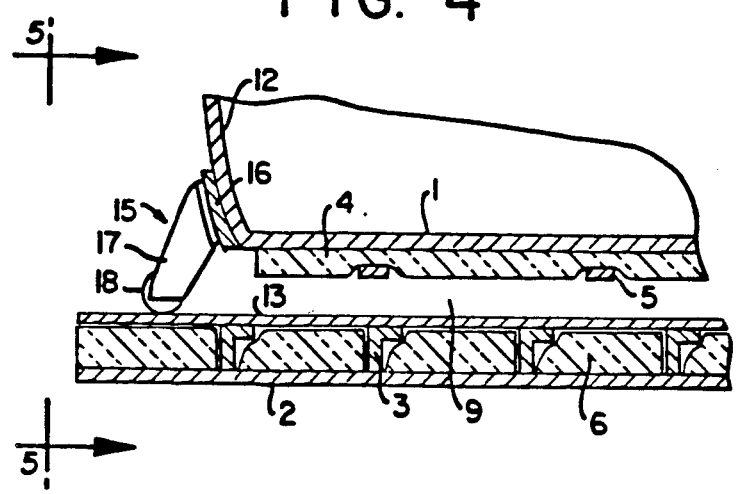
FIG. 4 is a partial cross-sectional elevational view of another preferred embodiment of the present invention, illustrating means for assembling a cryogenic trailer.

FIGS. 4 and 5 illustrate procedures for telescopingly positioning the inner vessel 1 within the outer shell 2 in accordance with the present invention. During at least part of this procedure, the inner vessel can be supported by means external to the assembly such as by a sling supported from a crane (not shown). A rigid "U" shaped track 13 is laid on the support rings 3 of the outer shell 2. Track 13 may be temporary or may be a permanent fixture and is provided with a groove or runner 14 into which a wheel assembly 15 is adapted to slide. The wheel assembly 15 is attached to the head of the inner vessel 1, and when engaged with track 13, provides additional support during assembly. The wheel assembly 15 consists of a faceplate 16 welded to the head of the inner vessel 1, from which a strut 17 having wheels 18 is attached. The strut 17 is preferably attached by bolts (not shown) to a flange (not shown) on the faceplate 16 so that it may be removed after the assembly procedure. This complicated track and wheel arrangement is necessary because of the size of the storage vessel. A typical inner vessel 1 is approximately 35 feet in length, 6 feet in diameter and would hold approximately 7400 gallons of cryogenic liquid. A typical outer vessel is approximately 37 feet in length and 6 feet 8 inches in diameter.

Figure 6:
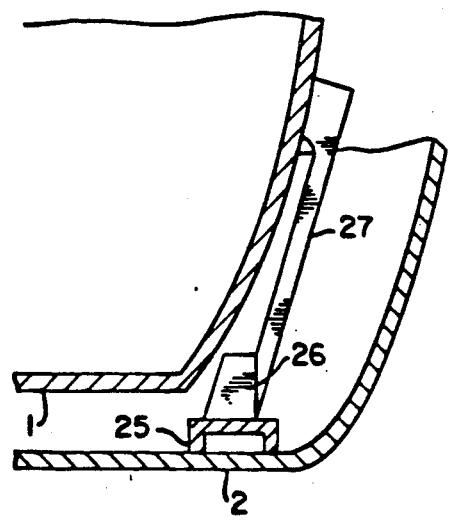
FIG. 6 is a partial cross-sectional view showing the means for supporting the inner vessel in spaced relation to the outer shell.

The inner vessel is supported in spaced relation to the outer shell by any-well-known load-rod design,—as for example, partly illustrated in FIG. 6, the particulars of which are well-known to those skilled in this technology. Briefly, an annular U-shaped support ring 25 is attached to the outer shell 2. Ring 20 has a number of radially directed flanges 26 attached thereto at circumferentially spaced positions around the outer shell 2. Radially oriented support beams 27 are then attached at one end to the flanges 26 and at their other end to the inner vessel 1. The present invention is not limited to any particular means for supporting the inner vessel 1 from the outer shell 2, since any conventional means is suitable as long as it does not easily conduct heat.

Figure 7:
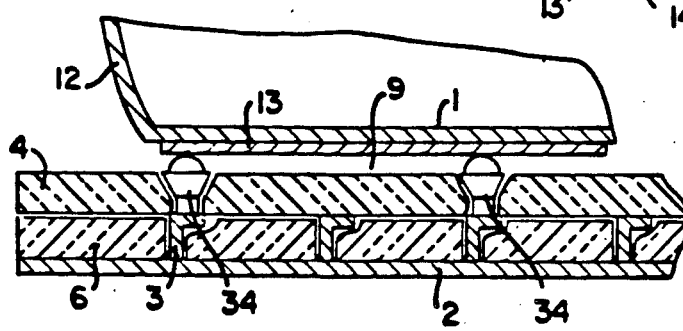
FIG. 7 is a partial cross-sectional elevational view of an alternative vessel made in accordance with the present invention.

FIG. 7 shows an alternative arrangement wherein the track 13 is securely fastened onto the inner vessel 1 and a wheel assembly 34 is secured by suitable struts to some of the support rings 3. In this alternative embodiment of the invention, all of the insulation can be secured to the outer shell 2.

At least one layer of insulation 6 must be applied to the outer shell so as to fill the space between adjacent stiffening rings, yet still allow a suitable annular gap 9 in the space for telescoping the inner vessel 1 within the outer shell 2. An additional layer of insulation 4 must also be provided to shield the inner ends of the axially-spaced support members 3 from the inner vessel 1, so as to reduce conductive heat in-leakage.

In the practice of this invention, vacuum levels below 50 microns of mercury are required in order that overall performance as good as or better than a perlite insulated trailer be maintained. Because of the annular clearance 9 between the inner vessel 1 and the outer shell 2 these vacuum levels are easily achieved and maintained.

In the preferred embodiment wherein insulation is secured to the outer shell 2 and the inner vessel 1, gas is evacuated though the insulation secured to the inner vessel 1 into the annular space 9 and gas is simultaneously evacuated through the insulation secured to the outer vessel 2 into the annular space. Therefore, the gas is evacuated through only one-half of the total insulation thickness (that insulation which is secured either to the outer shell 2 or to the inner vessel 1) and then through the annular space 9 thereby yielding a relatively higher vacuum conductance when compared to a system in which the entire intermediate evacuable space is filled with insulation.

In order to maintain these vacuum levels, a molecular sieve adsorbent is generally provided adjacent to the inner vessel 1 within the intermediate evacuable space as will be recognized by one skilled in vacuum technology for cryogenic storage vessels. The molecular sieve adsorbent facilitates the evacuation process by removing additional gases and thereby shortening the evacuation time.

We claim:

1. A method for fabricating a storage vessel useful for transporting cryogenic liquid comprising the steps of:
   (a) providing a cylindrically shaped closed inner storage vessel having a filling and discharge port and a vapor vent, said vessel being surrounded by a relatively thin coaxial outer shell, said vessel and said shell forming an evacuable space therebetween, said outer shell being provided with a plurality of axially-spaced circumferential support members extending into said evacuable space and spaced from the vessel, said support members being fixedly attached to and reinforcing said outer shell against the external atmospheric force applied thereto upon evacuation of said evacuable space,
   (b) non-compressively securing at least one layer of fiberglass insulation batting to the cylindrical portion of the inner wall of said outer shell so as to substantially fill the space between said support members,
   (c) providing a second layer of non-compressed fiberglass insulation batting to the outer wall of the inner storage vessel in sufficient amount to fill all but a small annular portion of the intermediate evacuable space while also shielding the inner ends of the axially-spaced support members from the vessel,
   (d) telescopingly positioning said vessel within the outer shell,
   (e) non-compressively securing additional layers of fiberglass insulation batting to the ends of the storage vessel, and
   (f) welding endplates to the outer shell.

2. A method for fabricating a storage vessel useful for transporting cryogenic liquid comprising the steps of:
   (a) providing a cylindrically shaped closed inner storage vessel having a filling and discharge port and a vapor vent, said vessel being surrounded by a relatively thin coaxial outer shell, said vessel and said shell forming an evacuable space therebetween, said outer shell being provided with a plurality of axially-spaced circumferential support members extending into said evacuable space and spaced from the vessel, said support members being fixedly attached to and reinforcing said outer shell against the external atmospheric force applied thereto upon evacuation of said evacuable space,
   (b) non-compressively securing a first layer of fiberglass insulation batting to the inner wall of the outer shell, in sufficient amount to fill substantially all of the evacuable space between the support members,
   (c) providing a second layer of non-compressed fiberglass insulation batting to the inner wall of the outer shell in sufficient amount to fill all of the intermediate evacuable space except for a small annular portion between the layers of insulation and the inner vessel and to shield the inner ends of the axially-spaced support members from the inner vessel,
   (d) telescopingly positioning said vessel within the outer shell,
   (e) non-compressively securing additional layers of fiberglass insulation batting to the ends of the storage vessel, and
   (f) welding endplates to the outer shell.

3. The method of claim 1 wherein the vacuum level in the evacuable space is maintained below 50 microns of mercury.

4. The method of claim 2 wherein the vacuum level in the evacuable space is maintained below 50 microns of mercury.

5. The method of claim 1 wherein the small annular portion of the evacuable space between the two layers of insulation, which is not filled with insulation, has an annular width in the range of from 0.25 to 1.25 inches.

6. The method of claim 2 wherein the small annular portion of the evacuable space between the two layers of insulation and the inner vessel, which is not filled with insulation, has an annular width in the range of from 0.25 to 1.25 inches.

7. The method of claim 1 wherein the inner vessel is telescopingly positioned within the outer shell by a procedure comprising externally supporting the inner vessel, laying a rigid track on the support members, providing a wheel assembly to the inner vessel, engaging the wheel assembly with the rigid track, and sliding the inner vessel along the rigid track to telescopingly position the inner vessel within the outer shell.

8. The method of claim 7 wherein the rigid track and/or the wheel assembly is removed from the storage vessel after the inner vessel is telescopingly positioned within the outer shell.

9. The method of claim 2 wherein the inner vessel is telescopingly positioned within the outer shell by a procedure comprising externally supporting the inner vessel, securing a rigid track on the inner vessel, securing a wheel assembly on some of the support members, engaging the wheel assembly with the rigid track, and sliding the inner vessel along the rigid track to telescopingly position the inner vessel within the outer shell.

10. The method of claim 9 wherein the rigid track and/or the wheel assembly is removed from the storage vessel after the inner vessel is telescopingly positioned within the outer shell.

11. The method of claim 1 wherein molecular sieve adsorbent is provided to the evacuable space.

12. The method of claim 2 wherein molecular sieve adsorbent is provided to the evacuable space.

* * * * *

UNITED STATES PATENT AND TRADEMARK OFFICE
CERTIFICATE OF CORRECTION

PATENT NO. : 4,674,674

DATED : June 23, 1987

INVENTOR(S) : M.F. Patterson et al

It is certified that error appears in the above-identified patent and that said Letters Patent is hereby corrected as shown below:

In column 1, line 44 delete "hereby" and insert therefor --thereby--.

In column 3, line 48 delete "a" and insert therefor --an--.

In column 5, line 53 delete "system" and insert therefor --systems--.

Signed and Sealed this

Twenty-sixth Day of April, 1988

Attest:

DONALD J. QUIGG

*Attesting Officer*  *Commissioner of Patents and Trademarks*